Dec. 6, 1949　　　　S. M. THOMSEN　　　　2,490,662
SKELETONIZING GLASS

Filed Sept. 21, 1946　　　　　　　　　　2 Sheets-Sheet 1

CHANGE IN SILICA SOLUBILITY WITH CONCENTRATION OF $H_2SiF_6$

POTENCY CHANGE REQUIRED AFTER DILUTION TO 1.25 MOLAR TO TREAT WINDOW GLASS AT 45°C.

REFLECTIVITY OF FILM AS A FUNCTION OF SOLUTION POTENCY. (MEASURED WITH MONOCHROMATIC LIGHT — WRATTEN No. 62 FILTER).

Inventor
Soren M. Thomsen
By
C. D. Anska
Attorney

REFLECTION AS A
FUNCTION OF
TREATING TIME.
PLATE GLASS
1.40 M SOLUTION, 55°C.

Patented Dec. 6, 1949

2,490,662

UNITED STATES PATENT OFFICE 2,490,662

SKELETONIZING GLASS

Soren M. Thomsen, Pennington, N. J., assignor to Radio Corporation of America, a corporation of Delaware Application September 21, 1946, Serial No. 698,441

6 Claims. (Cl. 41—42)

This invention relates to the art of removing part of the constituents of a glass surface so that a very thin surface zone is formed having certain desirable optical properties. Since it appears that the treated glass surface is left with a network of silica having voids between the molecules, the process may be termed one of skeletonization. The primary purpose of the treatment is to provide the glass with reflection-reducing properties.

Previous to this invention, processes have been devised for forming skeletonized surface layers on glass surfaces for the purpose of reducing reflection of incident light therefrom. These processes have depended upon treating the glass in the vapor arising from a treating solution. They have produced satisfactory non-reflecting films but controlling them to produce films having a certain desired index of refraction was very difficult and the results were influenced greatly by temperature changes, convection currents and the like. An earlier application of F. H. Nicoll and F. E. Williams, Serial No. 550,080, filed August 18, 1944, now Patent No. 2,486,431, November 1, 1949, described an improved method of producing a skeletonized reflection-reducing film in which the glass was immersed in a specially prepared treating solution. The present application contains some subject matter in common with that of the earlier application and additional matter involving further refinements and improvements.

One object of the present invention is to provide an improved method of providing a glass surface with a skeletonized film having reflection-reducing properties using a solution in which the glass is immersed for treating.

Another object is to provide an improved method of providing a glass surface with a skeletonized film having reflection-reducing properties in which the treating solution used has an accurately controlled content of excess silica.

Another object is to provide an improved method of controlling the potency of a solution used to provide a skeletonized film on a glass surface.

Another object is to provide an improved method of controlling the index of refraction of skeletonized film on glass.

Another object is to provide a method of keeping a treating solution, for skeletonizing glass, over extended periods of time.

Another object is to provide an improved method for providing a glass surface with a skeletonized film in which more uniform results are secured.

Still another object is to provide an improved method of cleaning glass which is to be filmed by the present method.

These and other objects will be more apparent from the following description taken in conjunction with the accompanying drawings of which Fig. 1 is a graph showing the change in silica solubility per mol of $H_2SiF_6$ taking 1.25 molar acid as a zero reference point.

In general, the method of the present invention comprises making up a solution of fluosilicic acid which is supersaturated with silica to the extent of about zero to 3 millimoles per liter at a convenient treating temperature, immersing the glass to be treated and leaving it in the solution until the surface has been skeletonized to a desired extent. The extent of treatment is directly related to the extent to which the treated surface reduces the reflection of incident light and this in turn is indicated by the apparent interference color of the skeletonized layer which is formed in the surface of the glass.

When the earlier forms of the present process were developed, it was not at first appreciated that the process of skeletonized film formation depends mainly on the amount of silica present in the solution above the saturation value. Ordinarily, it would be supposed that a solution supersaturated with respect to silica would simply deposit some or all of the excess on surfaces with which it was in contact and not dissolve more silica and metallic oxides as well. It had been thought, on the other hand, that the process depended on the pH of the solution among other factors. This latter has now been found to be only of secondary importance, however, the main factor being recognized as the amount of silica above saturation present in the solution.

According to the theoretical formula of fluosilicic acid, $H_2SiF_6$, the gram molecular ratio of silicon to fluorine should be 1 to 6 in the compound. Commercial fluosilicic acid, however, was found to vary considerably as to this ratio, some of the material proving to have a silicon to fluorine ratio of about 1 to 5.8. It was further found that still more silicon in the form of silica could be dissolved in $H_2SiF_6$ at room temperature, the final stable solution having a silicon to fluorine ratio of about 1 to 5.2. Moreover, it was found that this apparent excess of silica over that called for by the usually ascribed formula was apparently present in a truly combined state although what the real formula of the compound should be is not certain and will not be attempted here.

Figure 1:
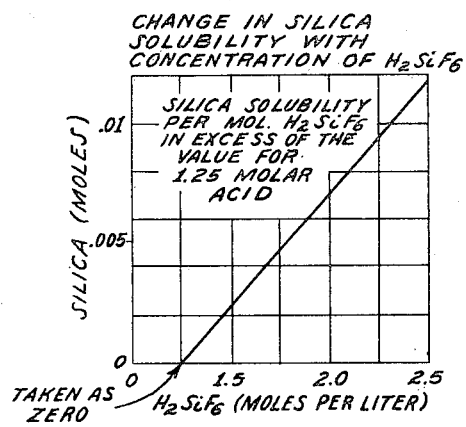

It was also found unexpectedly that the amount of silica needed to saturate a fluosilicic acid solution increases with the molar concentration. This is shown in Fig. 1 and has also been discussed in a related application of S. M. Thomsen and F. H. Nicoll, Serial No. 691,158, filed August 16, 1946, now abandoned.

An example of a convenient procedure for making up a treating solution will now be described. A sample of commercial 30 percent fluosilicic acid is first titrated to find the assay in moles $H_2SiF_6$ per liter. This may be done by titrating a 5.00 ml. sample with 2N—NaOH at 80° C. to a phenolphthalein end point. If B ml. of N—normal NaOH were consumed, the assay is $$\frac{(B)(N)(100)}{3} = M \text{ moles per liter}$$

The raw acid may then be diluted with water to reduce the assay to 1.40 molar. Precipitated silicic acid or hydrated silica is added and allowed to remain in contact with the acid at room temperature, 25° C. for about 24 hours although solution may be complete in as little as 1 hour. The diluted commercial solution may be expected to dissolve about 20 gm. of silica per liter and a reasonable excess should be provided. The solution is filtered until a clear filtrate is obtained.

The filtrate, which is 1.4 molar, silica saturated acid, is diluted to 1.25 molar, put into a treating tank, and preferably heated to 45° C. As shown in Fig. 1, a 1.4 molar solution of $H_2SiF_6$ saturated with silica is capable of dissolving about 1.2 more millimoles of silica per mole $H_2SiF_6$ than a 1.25 molar solution of the acid. By diluting the saturated 1.4 molar solution to 1.25 molar, there is thus obtained an excess of silica above the saturation point of about 1.2 millimoles per mole $H_2SiF_6$ or about 1.5 millimoles per liter of solution.

A solution thus made up will treat either L. O. F. or Pittsburgh window glass to form a reflection-reducing film at 25° C. but may be raised to 45° C. in order to decrease the treating time.

Whether or not a treating solution will produce a skeletonized film on a particular glass is determined by a factor which may be called solution potency. A solution too low in potency may deposit a film of silica on glass instead of producing a skeletonized surface layer. On the other hand, if the potency becomes too high, the solution will simply dissolve off a uniform layer of glass instead of forming a film.

One important aspect of this invention is the control of solution potency in order to prevent it from drifting outside the treating range with use or merely upon standing for a period of time.

As stated previously, a treating solution of proper potency should have between about zero and about 3 millimoles excess silica per liter of solution, above the saturation value, the exact value depending upon the type of glass to be treated. Solutions not quite saturated with respect to silica may be said to be too potent while those having a greater excess of silica than 3 millimoles per liter are not potent enough since they tend to deposit silica rather than attack the glass. It is also possible to have a solution which is potent enough to form a skeletonized film on one type of glass but which may deposit silica on another type. This may happen, for example, at potencies of 2 to 3 millimoles excess silica per liter.

*Method of controlling solution potency*

In order to increase the potency of a solution, hydrofluoric acid, HF, may be added. For a 1.25 molar solution of fluosilicic acid at 25° C. by definition the potency of a solution is increased by one unit upon the addition of one millimole of HF per liter of solution. For convenience, either NaF or KF are preferred and 1.5 millimoles of either have been found to be equivalent to 1 millimole of HF. It has also been found that at the concentration and temperature specified, five potency units are equivalent to 1 millimole of silica. A solution which is exactly saturated with silica is taken as having zero potency.

In order to decrease potency, boric acid, $H_3BO_3$, has been found most convenient. This is not the only reagent which may be used, however. In general a reagent is needed for this purpose which will push the $F^-$ to $SiO_2$ balance in the direction of less $F^-$ and more $SiO_2$ without disturbing the acidity. If the latter desirable requirement is not adhered to, other materials such as water, sodium hydroxide, or sodium silicate may be used, although they are less satisfactory. It has been found that 1 millimole of boric acid diminishes potency by the same amount that 3 millimoles of HF increase it. Thus, ⅓ of a millimole of boric acid may be said to decrease potency by one unit at 1.25 molar $H_2SiF_6$ concentration, according to the present definition. Stated in more easily usable terms, a unit decrease in potency is brought about by adding 0.5 ml. of 4.0 percent boric acid to a liter of solution. The action of boric acid in reducing solution potency appears to be linked to the fact that boron, like silicon, forms fluorine compounds, $BF_3$ analogous to $SiF_4$, and $HBF_4$ analogous to $H_2SiF_6$. Presumably, the addition of boric acid consumes $F^-$, thereby disturbing the $SiO_2$—$F^-$ balance, which carried far enough results in precipitation of the freed silica.

Figure 2:
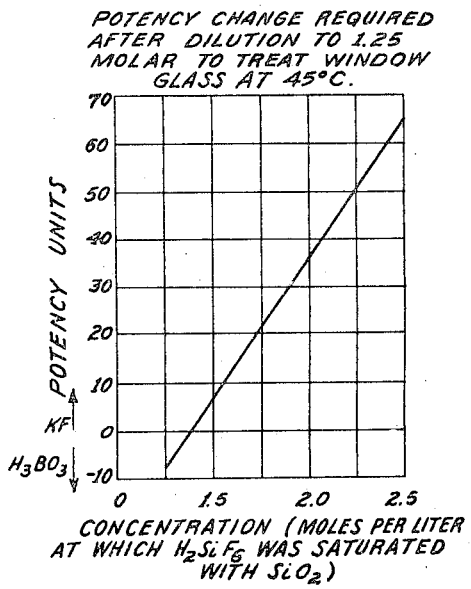
Fig. 2 is a graph showing the potency change required after diluting various concentrations of fluosilicic acid to 1.25 molar, in order to adjust them to treat Libbey-Owens-Ford window glass.

The manner in which the potency of solutions of varying concentration of $H_2SiF_6$ must be adjusted in order to prepare them to produce a skeletonized reflection-reducing layer on a particular glass is graphically illustrated in Fig. 2. The graph shows that all solutions made up at 25° C. for all concentrations above 1.4 molar must have their potency increased after dilution to 1.25 molar in order to treat Libbey-Owens-Ford window glass at 45° C. For example, a 2 molar saturated solution prepared at 25° C. after being diluted should have its potency increased by 35 units in order to treat at 45° C. This may be done by adding 35 millimoles of HF per liter of solution or, more conveniently, about 52.5 millimoles of KF. The potency change required will be different for each kind of glass treated although the variation will not be great.

If a treating solution is allowed to stand unused for a period of time, its potency slowly increases. This has been found to be due to a very slow deposition of silica on the walls of the container and is to be expected since a treating solution is slightly supersaturated with respect to silica. If the increase in potency were not compensated, the solution would produce films of increasing softness and finally the glass would be removed uniformly with no film formation at all. The drift has been found to amount to about ¼ potency unit per day at 35° C. ½ unit at 45° C. and 1 unit at 55° C. for recently prepared solution in a Lucite container. Since the drift can easily be compensated for by adding a measured amount of boric acid each day, it is not particularly troublesome. When glass is being treated in the solution each day, the drift may be compensated automatically since each square foot of glass surface treated reduces the potency of 20 liters of solution by 0.075 potency units.

*Action of the treating solutions on glass*

The manner in which the treating solutions produce a reflection-reducing layer on glass is not entirely understood although the characteristics of the layer or film, itself, are now pretty well established.

A low reflection film on glass commonly consists of a layer of material of low index of refraction, of such thickness, generally ¼ the wavelength of green light, that interference operates to reduce reflection. If the material is of optimum index, the green is effectively extinguished, and other colors are greatly reduced.

Magnesium fluoride is an example of a widely used material for forming an evaporated type of film. A layer of material of proper thickness is deposited on the glass, adding slightly to its volume and weight. However, the index of refraction of this film is considerably higher than the optimum for crown glass, with the result that the reflection is reduced only to about 30 percent of the original.

In the method of the present invention as in those processes described in aforementioned application, Serial No. 550,080, the treating solution dissolves out of the surface of the glass substantially all of the metallic oxides and some of the silica. This produces a zone very shallow in depth consisting of silica molecules separated by voids. In the process of forming this layer, it appears that silica is simultaneously dissolved from the glass surface and redeposited at spaced points.

That the surface layer is a skeletonized film appears certain from several different kinds of evidence. Electron microscope photographs indicate that the film has a porous or skeletonized structure. The films absorb grease or oil readily also and become contaminated with dirt upon being exposed to the air for a lengthy period of time. The contaminating material can then be washed out using a solution of a wetting agent and the film is about as good as when freshly made. Another type of evidence strongly supports the idea that the film is a skeletonized zone rather than a superimposed film. Pieces of glass weighed before and after treating show a loss in weight of $1.3 \times 10^{-5}$ gm. per ¼ wave thickness per cm.$^2$ of surface. This figure remains nearly constant to a film thickness of 6 quarter waves. Since the mass of the glass itself originally present in the volume occupied by 1 cm.$^2$ of film was $2.4 \times 10^{-5}$ gm., it is seen that the treating process removes about half of this in forming the film.

Probably the best proof of all that the film is a skeletonized layer of silica lies in the indices of refraction which can be attained in these films. The optimum index of refraction for a low index film on crown glass of refractive index equal to 1.5 is 1.225. However, no solid material is known having an index of refraction this low. From the Clausius-Mosotti equation $$(n^2-1)/(n^2+2) = kd$$

where $k$ is a constant and $d$, the density of the material, it can be calculated that a film having the desired refractive index would have to be composed of about 50 percent silica. This supports the experimental results found as indicated in the preceding paragraph.

When a piece of glass is treated in order to produce a film having the least obtainable amount of reflection of incident green light, it is immersed in the treating solution until the film shows a distinct purple color by reflected light. This color indicates only that the film is about ¼ wavelength in thickness for green light of about 5000 Å. In order to obtain maximum reduction in reflection, however, the film must also have the proper index of refraction which may be taken to be the square root of the index of refraction of the glass being treated.

Figure 3:
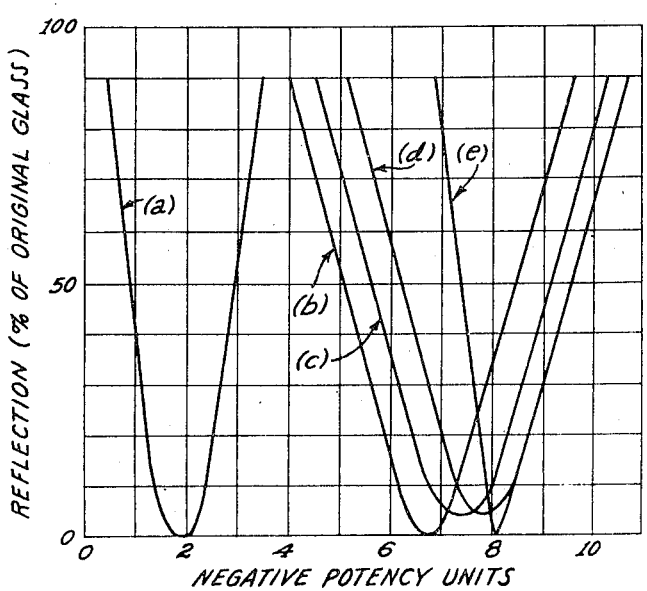
Fig. 3 is a graph showing how percent reflection varies with potency of the treating solution.

Over a narrow range of potency, a solution will treat a particular glass. Within this range, the index of refraction, and hence the percent reflection for a ¼ λ film, will vary with potency. A graphical illustration of how the percent reflection can be varied by controlling the potency of the treating solution in the case of several different types of glass is shown in Fig. 3. Curve $a$ is for Pittsburgh Plate Glass Company's plate glass, $b$ is for Libbey-Owens-Ford plate glass, $c$ is for Libbey window glass, $d$ is for Libbey picture glass, and $e$ is for Pittsburgh picture glass Curve $a$, for example, shows that for Pittsburgh plate, of the lot tested, optimum potency of treating is 2 negative units and that on either side of this value the percentage of reflection rises sharply. On the other hand Libbey plate glass does not begin to treat until the solution has a negative potency of 4 units and optimum is about 7. For each glass and starting with the lower limit of potency within the treating range, as potency is increased, larger amounts of silica are removed from the glass and index of refraction diminishes. The reflection likewise diminishes until the optimum index is reached; beyond this value as the index decreases further, the reflection again increases. Any index, therefore, from that of the glass, itself, down to the optimum value for minimum reflection and lower, can be had by adjusting the potency of the solution. Samples of plate glass have had their reflection reduced to 1 percent of the original untreated value, as measured with green light, Wratten No. 62 filter. The hardness of the film diminishes as its index of refraction decreases but even the 1 percent reflectance films are hard enough to withstand repeated ordinary washings and cleanings although they should be protected from abuse.

The best points to operate along the curves shown in Fig. 3 are along the right leg near the bottom.

The results obtained using the present process are dependent upon several different and varying factors. One of these is the type of glass being treated. In general, it may be said that the crown glasses, which are mostly soda-lime glasses, treat most satisfactorily. The flint glasses may be treated but in most instances not nearly as satisfactorily. Optical crown glass may also be treated, but Pyrex glass is resistant to treating and some other glasses cannot be treated because they are acid soluble. Within each group which can be treated, the potency of solution required varies as does the treating time. Different lots of the same glass may also treat differently but the variations fall within the general limitations which have been described.

Another factor is the treating temperature since this influences both time of treating and potency. In general, the rate of treatment increases logarithmically with increase in temperature. If the temperature is too low, the treating time is undesirably long. On the other hand, if the temperature is high, although treating becomes very rapid, the solutions become unstable and drift out of the treating range quickly. The best temperature range of operation appears to be 25°–45° C. Solutions maintained at 45° can be kept operative for many months. Solutions kept at higher than 45° C., as for example 55° C., can be used for short periods of rapid treating but are very unstable.

Figure 4:
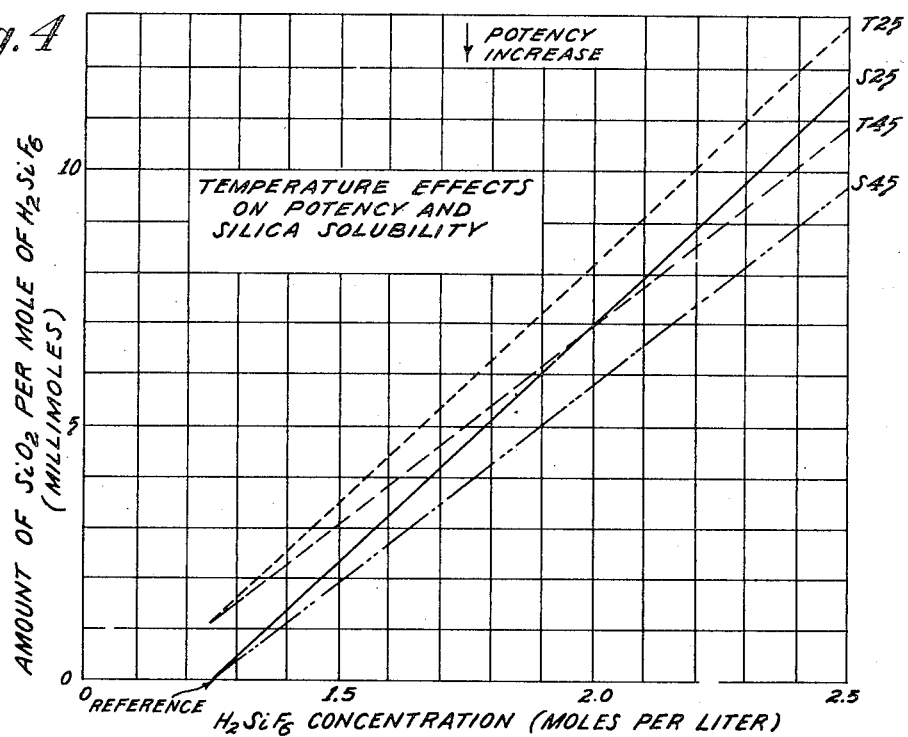
Fig. 4 is a graph showing the effects of temperature on silica solubility at various concentrations of fluosilicic acid.

Temperature also affects silica solubility in fluosilicic acid and hence influences the potency of the solutions. Fig. 4 is a graphical comparison of saturated and treating solutions at 25° and 45° C. S—25 is a curve of silica solubility in millimoles per mole of $H_2SiF_6$ at 25° C. for solutions of $H_2SiF_6$ ranging from 1.25 to 2.5 molar. Curve S—45 is the same taken at 45° C. A comparison shows that for a 1.25 molar solution of fluosilicic acid, the solubility of silica is the same at 45° C. as at 25° C. However, as the concentration is increased, the solubility of the silica increases at either temperature but the increase is less at 45° than at 25° C. T—25 and T—45 are curves showing the amount of silica which must be present at various concentrations of $H_2SiF_6$ to treat Libbey window glass at 25° and 45° C., respectively. Comparison of the curves shows that at both temperatures a treating solution should contain about 1 millimole of silica per mole of $H_2SiF_6$ in excess of that present in a saturated solution at the same molar concentration of $H_2SiF_6$, provided the volume of solution remains constant. The figure also shows that for a 2 molar solution of $H_2SiF_6$ a solution saturated with silica at 25° C. becomes a treating solution when raised to 45° C. but that at all other concentrations the potency of a saturated solution at 25° C. must be adjusted when its temperature is raised to 45° C. Another way of stating the facts presented in these curves is that saturated solutions at both 25° and 45° C. must have their potencies lowered in order to become good treating solutions. Data have also been obtained for the change in silica solubility with temperature when the concentration remains constant but the results are so variable that no exact rule can be derived. A general rule appears to be, however, that at room temperature silica solubility in fluosilicic acid decreases with increasing temperature, rate of decrease being different for each concentration while at 45° C. silica solubility increases with increasing temperature.

Since silica solubility changes with temperature, it is possible to prepare a saturated but non-treating solution of silica in fluosilicic acid at a relatively low temperature and raise it to a temperature at which it will treat glass. This is so since in some cases raising the temperature decreases the solubility of the silica, thus providing a slight excess over saturation which may be just enough to convert it to a treating solution. For example, as stated above, a 2 molar solution saturated with silica at 25° C. becomes a treating solution at 45° C.

Figure 5:
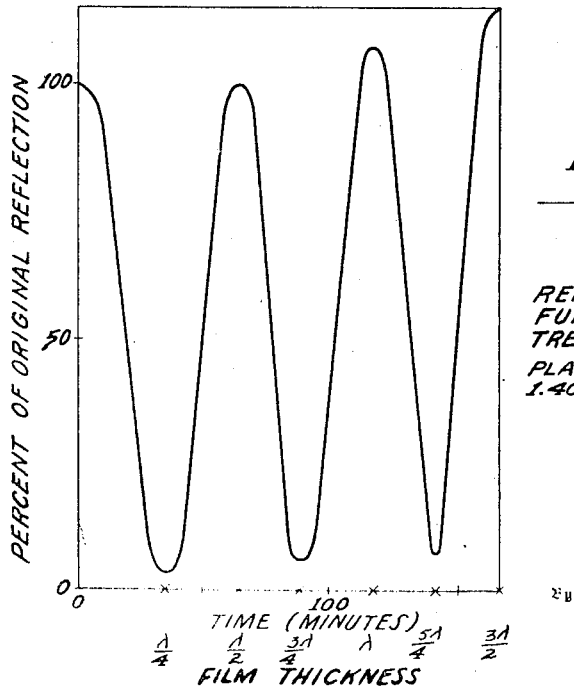
Fig. 5 is a graph of percent of original reflection plotted against treating time obtained by treating Pittsburgh plate glass with a treating solution of silica dissolved in 1.4 molar fluosilicic acid at 55° C.

As stated previously, time of treatment decreases as temperature of treatment increases. It is also apparent that the thickness of the skeletonized layer and hence the reduction in the reflectance secured will in turn depend upon time of treatment. This is illustrated in Fig. 5. This figure shows how the reduction in reflection changes with the time of treatment. The curve is for a treating solution of optimum potency using 1.4 molar fluosilicic acid at 55° C. on Pittsburgh Plate Glass Company plate glass. As shown in the figure a $\lambda/4$ wave film, for 5000 Å. green light, was obtained in about 40 minutes with the reflection being less than 5 percent of that of the untreated glass. As treatment continued, the reflection value rose until it was back to the original at a half wavelength thickness. A minimum was again obtained at about 90 minutes treating time and a three-quarter wavelength film but the minimum this time was not as low as with the one-quarter wavelength film. Had solutions of other than optimum potency been used, the curve would not have shown the same regular peak variations nor would the minimum reflection value have been as ideally low.

Within ordinary limits, the concentration of fluosilicic acid used in treating solution does not appear to be particularly critical although the rate of treatment varies directly with concentration. Solutions of from 1 to 2.5 molar have proven satisfactory and for convenience and the sake of stability 1.25 to 1.4 molar solutions are preferred. Solutions below 1 molar can also be used but the treating time becomes inconveniently long. Also, somewhat higher concentrations may be used, although these quickly become unfit for use upon standing. It may also be pointed out that since both temperature and concentration contributes to instability of solutions relatively higher concentrations may be used with relatively lower temperatures and vice versa.

There are other factors affecting the treating process which, although of a secondary nature, still are important. One of these is the pretreatment of the glass in order to produce a uniform film in the treating solution. Glass which has been exposed to the atmosphere for some time is known to contain a superficial film, nature of which is not accurately known. This must be removed for good results in the present process. Many ordinary cleaning methods such as treatment in concentrated sulfuric or nitric acids or materials such as sodium metaphosphates, are not satisfactory. Unexpectedly, however, it has been found that the glass can be prepared by dipping in materials which are solvents for pure silica. Thus, if the glass, after having been cleaned in a scouring powder to remove dirt and grease, is next dipped in 0.5 percent hydrofluoric acid at room temperature for about 10-20 seconds or in hot concentrated sodium hydroxide for about 1 minute, it can then be treated successfully. This may be due to the formation of a silica film on weathered glass which must be removed before it can be treated.

Uniformity of film formation is also enhanced by stirring to equalize convection throughout the solution. It was also found that stirring produces an apparent increase in potency of about 2 units.

Although the method of preparing the treating solutions above described is the most reliable and accurate method of preparing solutions for treating glass according to the invention, it is also possible to prepare solutions in other ways. Another convenient method is to dissolve some silica-containing glass in a fluosilicic acid solution. For example, a solution suitable for producing a low index reflection-reducing film on L. O. F. window glass can be made by digesting in 600 cc. of 16 percent $H_2SiF_6$ for 15 hours at 45° C. a piece of the same glass having a total surface area of about 3 square feet.

The pieces of glass in the solution of fluosilicic acid plus glass are periodically examined and their characteristic appearance indicates the progress of formation of the final treating solution. The steps are as follows: Soon after placing the glass in solution, the pieces are observed to have been strongly eaten away by the acid, the surface still having a polished appearance, however, due to the fact that the dissolving process is uniform. At this point, any glass protruding into the vapor will have a low reflection film on it. As the digestion of the glass continues, the attack on the glass in solution becomes less and less film is formed in the vapor. As this condition is reached, after several hours, it is observed that a low reflection film is formed on the glass at the meniscus and in any "trapped volumes," that is, regions where two pieces of glass almost touch, thus including a small volume of acid in proximity to a large area of glass. These "trapped volumes" are the first to reach the correct conditions for producing low reflection films. When the time of digestion is further continued, the exposed surfaces of the glass in the solution begin to show interference colors. After a further period of digestion, the glass surface becomes more highly colored with corresponding indications of low refractive index in the surface film.

At this point, the undissolved glass is removed and the solution is ready for producing a low-reflecting film on a new piece of glass which is immersed in the solution at this point. Such a solution produces a film of low reflection to green light of about 5000 Å. in about one-half hour. This film is on both sides of the glass and is satisfactory with respect to hardness and other mechanical properties.

Although the method just described is empirical, it can be made more accurate by analyzing the silica content of the solution until just the right excess over saturation is obtained and potency may also be adjusted, if necessary, by adding potassium fluoride or boric acid as the case may call for.

Solutions for treating a particular kind of glass do not need to be made up by digesting the same kind of glass since the glass is digested only in order to obtain some of its silica content.

It is also possible to prepare a treating solution by digesting glass in a mineral acid to which has been added a small quantity of hydrofluoric acid. The digestion of the glass can either be controlled by observing the stages outlined above or it can be controlled by analysis. The mineral acids which can be used are those such as $H_2SO_4$, $HCl$, $HNO_3$, and $H_3PO_4$.

The process which has been described affords a convenient and reliable method of forming highly efficient reflection reducing films on different types of glass. To determine whether a particular glass of unknown treating characteristics can be filled and what potency and treating time will be required, the following procedure may be used.

In each of 6 test tubes, solutions may be placed having potency of 0, $-2$, $-4$, $-6$, $-8$, and $-10$, at room temperature. Solutions of zero potency are taken as being just saturated with silica while those of $-10$ are taken as having 2 millimoles of silica per liter in excess of saturation. Samples of the glass are put in each tube, after warming to 45° C. The samples are examined, say every half hour until film has been detected, or if none has appeared after about 3 hours, the test is abandoned. If film formation is observed, the time is noted, and the potency required is taken as the lowest potency value to produce observable film.

Regardless of the method used in preparing the treating solutions, the adjusting of the excess silica content above the saturation value is the most important factor and by controlling this as described, excellent reflection-reducing films may be formed on a glass surface.

I claim as my invention:

1. The method of skeletonizing the surface of a glass object to a predetermined depth, comprising immersing the object in a solution of fluosilicic acid having a quantity of excess silica dissolved therein ranging from saturation to about 3 millimoles supersaturation per liter and terminating the process when the desired depth has been reached.

2. The method of producing on at least one surface of a glass object a film designed to reduce reflection of impinging light of a certain predetermined wavelength, comprising immersing said object in a solution of fluosilicic acid having a quantity of excess silica dissolved therein ranging from saturation to about 3 millimoles supersaturation per liter and continuing the treatment until a skeletonized layer of desired depth and index of refraction has been formed in said glass surface whereby the desired reduction in reflection is accomplished.

3. A method of treating a surface of a glass object whereby a skeletonized film of substantially pure silica is formed in said surface, said method comprising preparing a treating solution by dissolving sufficient silica in a solution of fluosilicic acid to make the solution supersaturated with respect to silica to the extent of about zero to 3 millimoles per liter and immersing said glass object in said solution until a skeletonized silica film of desired characteristics has been formed.

4. A method of skeletonizing a surface of a glass object to a predetermined depth, comprising pre-treating said object in a solution of a silica solvent for a brief period of time in order to remove a uniform layer of silica, then immersing said object in a solution of fluosilicic acid having a quantity of excess silica dissolved therein ranging from saturation to about 3 millimoles supersaturation per liter and terminating the process when a desired depth of skeletonization has been reached, said depth being indicated by the wavelength of light predominantly reflected by said surface.

5. A method of treating a surface of a glass object whereby a skeletonized film of substantially pure silica is formed in said surface, said method comprising preparing a treating solution by dissolving sufficient silica in a solution of fluosilicic acid to make the solution supersaturated with respect to silica to the extent of about zero to 3 millimoles per liter, immersing said glass object in said solution, maintaining the solution under agitation, and continuing the treatment until a skeletonized silica film of desired depth has been formed.

6. A method of treating a surface of a crown glass object whereby a skeletonized film of substantially pure silica is formed in said surface, said method comprising preparing a treating solution by dissolving sufficient silica in a solution of fluosilicic acid to make the solution supersaturated with respect to silica to the extent of about 1 millimole per mole per liter of fluosilicic acid solution, immersing the glass object in said agitation, and continuing the treatment until a skeletonized film of desired depth has been formed.

SOREN M. THOMSEN.

REFERENCES CITED

The following references are of record in the file of this patent:

UNITED STATES PATENTS

| Number | Name | Date |
|---|---|---|
| 254,263 | Bitterlin | Feb. 28, 1882 |
| 1,565,869 | Straw | Dec. 15, 1925 |
| 2,118,386 | Swinehart | May 24, 1938 |
| 2,337,460 | French | Dec. 21, 1943 |

OTHER REFERENCES

Mellor, Comprehensive Treatise on Inorganic and Theoretical Chemistry, vol. 6, 1925, pages 941–943.

Certificate of Correction

Patent No. 2,490,662 December 6, 1949

SOREN M. THOMSEN

It is hereby certified that errors appear in the printed specification of the above numbered patent requiring correction as follows:

Column 10, line 7, for the formula "HClHNO₃" read *HCl, HNO₃*; line 13, for the word "filled" read *filmed*; column 12, line 4, for "agitation" read *solution*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*